(12) United States Patent
Zhang et al.

(10) Patent No.: US 12,309,481 B2
(45) Date of Patent: May 20, 2025

(54) WHEEL IMAGE ACQUISITION ASSEMBLY, WHEEL POSITIONING APPARATUS, AND WHEEL POSITIONING SYSTEM

(71) Applicant: Autel Intelligent Technology Corp., Ltd., Shenzhen (CN)

(72) Inventors: Dengguo Zhang, Shenzhen (CN); Min Zeng, Shenzhen (CN); Yongchao Wang, Shenzhen (CN)

(73) Assignee: Autel Intelligent Technology Corp., Ltd., Shenzhen (CN)

(*) Notice: Subject to any disclaimer, the term of this patent is extended or adjusted under 35 U.S.C. 154(b) by 172 days.

(21) Appl. No.: 18/167,877

(22) Filed: Feb. 12, 2023

(65) Prior Publication Data
US 2023/0196620 A1 Jun. 22, 2023

Related U.S. Application Data

(63) Continuation of application No. PCT/CN2021/110857, filed on Aug. 5, 2021.

(30) Foreign Application Priority Data

Aug. 13, 2020 (CN) .......................... 202010813729.6

(51) Int. Cl.
H04N 23/57 (2023.01)
G01B 11/275 (2006.01)
(Continued)

(52) U.S. Cl.
CPC ........... *H04N 23/57* (2023.01); *G01B 11/275* (2013.01); *G01B 11/2755* (2013.01); *G06T 7/80* (2017.01);
(Continued)

(58) Field of Classification Search
CPC ........ H04N 23/57; H04N 23/00; H04N 23/50; H04N 23/51; H04N 23/54; H04N 23/55;
(Continued)

(56) References Cited

U.S. PATENT DOCUMENTS 5,675,515 A 10/1997 January
5,724,128 A 3/1998 January
(Continued)

FOREIGN PATENT DOCUMENTS

AU 3210297 A 12/1997
CN 106969726 A * 7/2017 ........... G01B 11/275
(Continued)

OTHER PUBLICATIONS

International Search Report of PCT Patent Application No. PCT/CN2021/110857 issued on Nov. 10, 2021.
(Continued)

*Primary Examiner* — Twyler L Haskins
*Assistant Examiner* — Akshay Trehan
(74) *Attorney, Agent, or Firm* — Andrew C. Cheng

(57) ABSTRACT

A wheel image acquisition assembly includes a base, a motor assembly and a camera module. One end of the base is for being connected to a support body in a wheel positioning apparatus, and the other end of the base is for being connected to the camera module. The motor assembly is mounted in the base and includes a motor for driving the camera module to rotate around the horizontal axis so as to adjust a pitch angle of the camera module. The camera module is used for acquiring image of wheels so as to determine the position of the wheels relative to a vehicle. The wheel image acquisition assembly can drive the camera module to rotate by means of the motor, so as to adjust the
(Continued)

visual field range of the camera module, which is more flexible, and facilitates wheel alignment positioning in a complex environment.

13 Claims, 4 Drawing Sheets

(51) Int. Cl.
| | | |
|---|---|---|
| *G03B 17/56* | (2021.01) | |
| *G06T 7/80* | (2017.01) | |
| *H04N 1/00* | (2006.01) | |
| *H04N 17/00* | (2006.01) | |
| *H04N 23/00* | (2023.01) | |
| *H04N 23/51* | (2023.01) | |
| *H04N 23/54* | (2023.01) | |
| *H04N 23/55* | (2023.01) | |
| *H04N 23/61* | (2023.01) | |
| *H04N 23/695* | (2023.01) | |
| *H04N 23/90* | (2023.01) | |

(52) U.S. Cl.
CPC ....... *H04N 1/00289* (2013.01); *H04N 17/002* (2013.01); *H04N 23/00* (2023.01); *H04N 23/51* (2023.01); *H04N 23/54* (2023.01); *H04N 23/55* (2023.01); *H04N 23/61* (2023.01); *H04N 23/695* (2023.01); *G01B 2210/143* (2013.01); *G01B 2210/30* (2013.01); *G03B 17/561* (2013.01); *G03B 2205/0007* (2013.01); *G03B 2205/0053* (2013.01); *G06T 2207/30244* (2013.01); *H04N 23/90* (2023.01)

(58) Field of Classification Search
CPC ...... H04N 23/695; H04N 23/90; H04N 23/61; H04N 1/00289; H04N 17/002; G01B 11/275; G01B 11/2755; G01B 2210/143; G01B 2210/30; G06T 7/80; G06T 2207/30244; G03B 17/561; G03B 2205/0007; G03B 2205/0053; F16M 11/00–128; F16M 11/18; F16M 13/00; B60R 11/04
See application file for complete search history.

(56) References Cited

U.S. PATENT DOCUMENTS

| | | | |
|---|---|---|---|
| 5,870,315 A | | 2/1999 | January |
| 6,839,972 B2 † | | 1/2005 | Jackson |
| 6,931,736 B2 † | | 8/2005 | Stopa |
| 7,982,766 B2 † | | 7/2011 | Corghi |
| 10,347,006 B2 | | 7/2019 | Kunert et al. |
| 10,692,241 B2 | | 6/2020 | Kunert et al. |
| 2003/0023395 A1 † | | 1/2003 | O'Mahony |
| 2004/0139620 A1 * | | 7/2004 | Stopa ................. G01B 11/2755 33/203.18 |
| 2016/0100087 A1 * | | 4/2016 | Scheich ................ G06T 1/0007 348/47 |
| 2016/0173740 A1 * | | 6/2016 | Corby ..................... H04N 23/60 348/148 |
| 2016/0195388 A1 | | 7/2016 | D'Agostino |
| 2018/0053320 A1 | | 2/2018 | Kunert et al. |
| 2019/0011806 A1 * | | 1/2019 | Zilban .................... B62D 63/08 |
| 2019/0279395 A1 | | 9/2019 | Kunert et al. |
| 2019/0279396 A1 | | 9/2019 | Kunert et al. |
| 2020/0074675 A1 * | | 3/2020 | Cejka ...................... F16M 11/42 |
| 2020/0320739 A1 | | 10/2020 | Kunert et al. |
| 2022/0066294 A1 * | | 3/2022 | Scheich ................. H04N 23/50 |

FOREIGN PATENT DOCUMENTS

| | | | |
|---|---|---|---|
| CN | 109606273 A | | 4/2019 |
| CN | 109923371 A | | 6/2019 |
| CN | 111413111 A | | 7/2020 |
| CN | 111457226 A | | 7/2020 |
| CN | 112013798 A | | 12/2020 |
| CN | 213274143 U | | 5/2021 |
| DE | 69706021 | | 9/2001 |
| EP | 0840881 A1 | | 5/1998 |
| EP | 3472555 A1 | | 4/2019 |
| EP | 3531682 A1 | | 8/2019 |
| TW | 201809596 A1 | | 3/2018 |
| TW | I638977 B | | 10/2018 |
| WO | 9744635 A1 | | 11/1997 |
| WO | 2018035040 A1 | | 2/2018 |
| WO | 2020143573 A1 | | 7/2020 |

OTHER PUBLICATIONS

The extended European search report of EP Patent Application No. 21855440.0 issued on Dec. 20, 2023.

* cited by examiner
† cited by third party

WHEEL IMAGE ACQUISITION ASSEMBLY, WHEEL POSITIONING APPARATUS, AND WHEEL POSITIONING SYSTEM

CROSS-REFERENCE TO RELATED APPLICATIONS

The present application is a continuation of International Patent Application No. PCT/CN2021/110857 filed on Aug. 5, 2021, which claims priority to the Chinese Patent Application No. 202010813729.6, entitled "wheel image acquisition assembly, wheel positioning apparatus, and wheel positioning system", filed on Aug. 13, 2020, to the China National Intellectual Property Administration, the entire contents of which are incorporated herein by reference.

PRIOR ART

The present application relates to the technical field of four-wheel positioning, and more particularly to a wheel image acquisition assembly, wheel positioning apparatus, and wheel positioning system.

BACKGROUND OF THE INVENTION

A four-wheel aligner is mainly used to detect the mutual position and angle between vehicle wheels to determine vehicle wheel positioning parameters, so as to guide vehicle maintenance technicians to adjust the wheel positioning parameters to meet the vehicle design requirements, achieve smooth and steady driving and safe driving of the vehicle, and reduce automobile fuel consumption and tire wear.

At present, the structure adopted by a wheel positioning apparatus is generally that two groups of cameras are respectively fixed on two sides of the cross beam so as to respectively capture images of regions where the wheels on the two sides of the vehicle are located, and the visual field range of the cameras is adjusted through the rotation of the cross beam, and at this time, the rotation modes of the two groups of cameras are synchronized. Therefore, it makes the operation of the visual field ranges of the two groups of cameras covering the regions where the wheels on two sides are located relatively complicated.

SUMMARY OF THE INVENTION

Embodiments of the present invention are intended to provide a wheel image acquisition assembly, wheel positioning apparatus, and wheel positioning system so that its motor assembly can drive the rotation of its camera module to individually adjust the visual field range of its camera module.

The embodiments of the present invention solve the technical problem by using the following technical schemes. A wheel image acquisition assembly is provided, and applied to wheel positioning, including a base, a motor assembly, and a camera module:
wherein one end of the base is used for connecting to a support body in a wheel positioning apparatus, and the other end of the base is used for connecting to the camera module;
the motor assembly is mounted in the base and comprises a motor, the motor being used for driving the camera module to rotate about a horizontal axis to adjust the pitch angle of the camera module;
the camera module is used for collecting an image of a wheel such that the position of the wheel relative to the vehicle is determined.

In some embodiments, the motor assembly further comprises a controller and a processor;
the processor is connected to the camera module, and the processor is used for determining a rotation angle according to an image of the wheel collected by the camera module;
the controller is connected to the processor, and the controller is used for controlling a motor according to the rotation angle so as to rotate the camera module.

In some embodiments, the motor assembly further comprises a controller;
the wheel image acquisition assembly is used for uploading the image of the wheel collected by the camera module to a processing device in the wheel positioning apparatus so as to determine a rotation angle;
the controller is used for controlling the motor according to the rotation angle so as to rotate the camera module.

In some embodiments, the motor assembly further comprises a transmission mechanism, and the motor is connected to the camera module via the transmission mechanism.

In some embodiments, the transmission mechanism comprises a first synchronous wheel, a synchronous belt, and a second synchronous wheel;
the first synchronous wheel is connected to the motor, the first synchronous wheel is connected to the second synchronous wheel via the synchronous belt, and the second synchronous wheel is coaxially fixed to the camera module;
the axis of the second synchronous wheel is parallel to the horizontal axis;
the motor is used for driving the first synchronous wheel to rotate so that the first synchronous wheel drives the second synchronous wheel and the camera module to rotate together via the synchronous belt.

In some embodiments, the transmission mechanism comprises a first driving wheel and a second driving wheel;
the first driving wheel is connected to the motor, the first driving wheel meshes with the second driving wheel, and the second driving wheel is coaxially fixed to the camera module;
the axis of the second driving wheel is parallel to the horizontal axis;
the motor is used for driving the first driving wheel to rotate so that the first driving wheel drives the second driving wheel and the camera module to rotate together.

In some embodiments, the base comprises a base body and two support frames provided on two opposite sides of the base body;
the base body is connected to a bracket in the wheel positioning system, and the camera module is rotatably mounted between the two support frames;
the motor assembly is mounted to one of the two support frames.

In some embodiments, the wheel image acquisition assembly further comprises a first rotation shaft and a second rotation shaft;
one end of the first rotation shaft is fixed to the camera module, and the other end is fixed to the second synchronous wheel;
one end of the second rotation shaft is fixed to the camera module, and the other end is rotatably connected to one support frame of the two support frames which is not mounted with a motor assembly.

to some embodiments, the camera module comprises two cameras, and the two cameras respectively collect images of two wheels on the same side of the vehicle; or the camera module comprises one camera, and one camera collects images of two wheels on the same side of the vehicle.

The present application also provides a wheel positioning apparatus, comprising:

a support body;

two above-mentioned wheel image acquisition assemblies, wherein the two wheel image acquisition assemblies are arranged at two ends of the support body in a transversely spaced manner, and when the support body is placed at a position relative to the vehicle, visual field ranges of the camera modules of the two wheel image acquisition assemblies respectively cover regions where the wheels on two sides of the vehicle are located;

and a processing device electrically connected to the two wheel image acquisition assemblies for controlling the rotation of the camera modules in the two wheel image acquisition assemblies about the horizontal axis so as to adjust the rotation angle of the camera module in the two wheel image acquisition assemblies.

In some embodiments, the processing device is used to control the camera modules in the two wheel image acquisition assemblies to rotate synchronously about the horizontal axis to adjust the rotation angle of the camera modules in the two wheel image acquisition assemblies.

In some embodiments, the camera module of the wheel image acquisition assembly is used for collecting image data of a wheel, and the processing device is further used for measuring the wheel state of the vehicle according to data collected by the camera modules of the two wheel image acquisition assemblies.

In some embodiments, the wheel positioning apparatus further comprises a calibration unit, the calibration unit comprises a calibration camera and a calibration target, the calibration camera is arranged on one of the two wheel image acquisition assemblies, and the calibration target is arranged on the other of the two wheel image acquisition assemblies;

the visual field range of the calibration camera covers the calibration target and is electrically connected to the processing device, and the processing: device is further used for determining the relative position of the two wheel image acquisition assemblies according to the image data collected by the calibration camera.

In some embodiments, the processing device is provided on the support body.

In some embodiments, the wheel positioning apparatus further comprises a reminder;

wherein the reminder is electrically connected to the processing device for prompting a user of an output result of the processing device.

The present application also provides a wheel positioning system applied to the four-wheel positioning of a vehicle, comprising a calibration device, two camera devices, and a processing system;

wherein the first camera device of the two camera devices comprises the above-mentioned wheel image acquisition assembly;

a second camera device of the two camera devices comprises the above-mentioned wheel image acquisition assembly and a calibration camera;

the calibration device is attached to wheels on two sides of the vehicle, the first camera device is provided on one side of the vehicle, a visual field range of the wheel image acquisition assembly of the first camera device faces the calibration device on one side of the vehicle for collecting a first calibration image of the calibration device on one side of the vehicle, the second camera device is provided on the other side of the vehicle, the visual field range of the wheel image acquisition assembly in the second camera device faces the calibration device on the other side of the vehicle for collecting a second calibration image of the calibration device on the other side of the vehicle, the visual field range of the calibration camera in the second camera device faces the first camera device, and the calibration camera is used for collecting a third calibration image of the first camera device;

the processing system is respectively connected to the two camera devices, and the processing system is used for determining the first position of a wheel on one side of the vehicle with respect to the first camera device according to the first calibration image, determining the second position of a wheel on the other side of the vehicle with respect to the second camera device according to the second calibration image, determining a relative position of the first camera device with respect to the second camera device according to the third calibration image, and determining a positional parameter of the wheel of the vehicle according to the first position, the second position, and the relative position.

Advantageous effects of the present invention are as follows: the wheel image acquisition assembly, wheel positioning apparatus, and wheel positioning system provided in the application drive the camera module to rotate through its own motor to individually adjust the visual field range of the camera module; therefore, it makes the operation of the visual field ranges of the two groups of cameras covering the regions where the wheels on two sides are located simple.

BRIEF DESCRIPTION OF DRAWINGS

One or more embodiments are illustrated exemplarily by the pictures in the corresponding accompanying drawings. These exemplary descriptions do not constitute a limitation on embodiments. Elements with the same reference numerals in the accompanying drawings are represented as similar elements. Unless otherwise stated, the drawings in the accompanying drawings do not constitute a limitation on the scales.

DETAILED DESCRIPTION OF THE INVENTION

Figure 1:
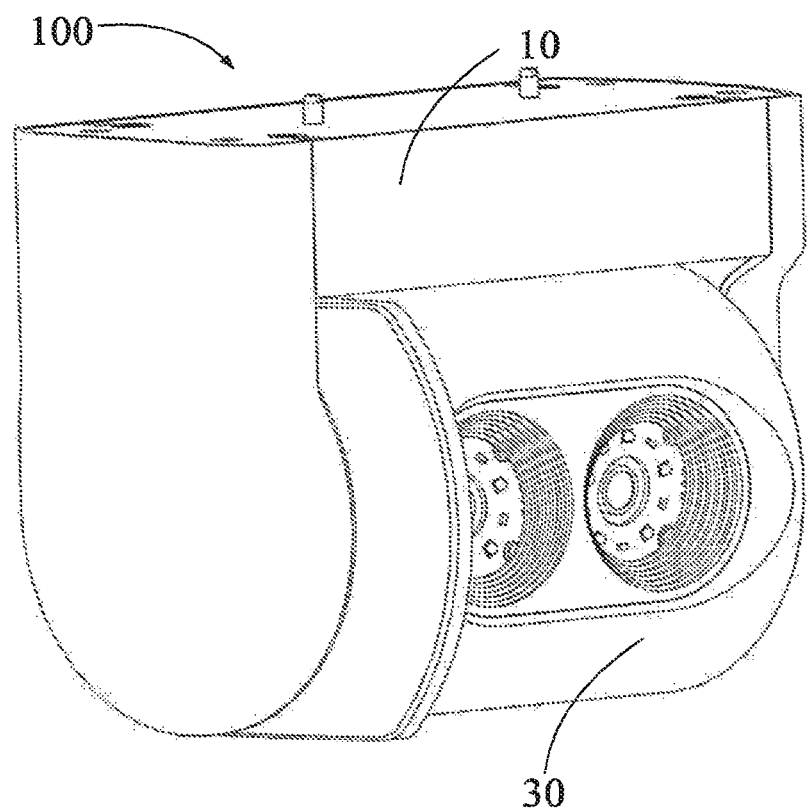
FIG. 1 is a schematic structural view of an image acquisition assembly of a wheel according to one of the embodiments of the present invention.

In order to make the present invention readily understood, a more particular description of the invention will be rendered by reference to accompanying drawings and specific embodiments. It needs to be noted that when an element is referred to as being "secured" to another element, it can be directly on another element or one or more intervening elements may be present in between. When one element is referred to as being "connected" to another element, it can be directly connected to another element or one or more intervening elements may be present in between. As used in the description, the orientations or positional relationships indicated by the terms "up", "down", "inside", "outside", "vertical", "transverse" and the like are based on the orientations or positional relationships shown in the drawings for purposes of describing the invention and simplifying the description only, and are not intended to indicate or imply that the referenced device or element must have a particular orientation or be constructed and operated in a particular orientation. It is therefore not to be understood as limiting the invention. Furthermore, the terms "first", "second", and the like are used for descriptive purposes only and are not to be construed as indicating or implying relative importance.

Unless defined otherwise, all technical and scientific terms used herein have the same meaning as commonly understood by one of ordinary skill in the art to which this invention belongs. The terminology used herein in the description of the invention herein is for the purpose of describing particular embodiments only and is not to be limiting of the present invention. As used herein, the term "and/or" includes any and all combinations of one or more of the associated listed items.

Further, the technical features involved in different embodiments of the present invention described below can be combined with each other as long as they do not conflict with each other.

Figure 2:
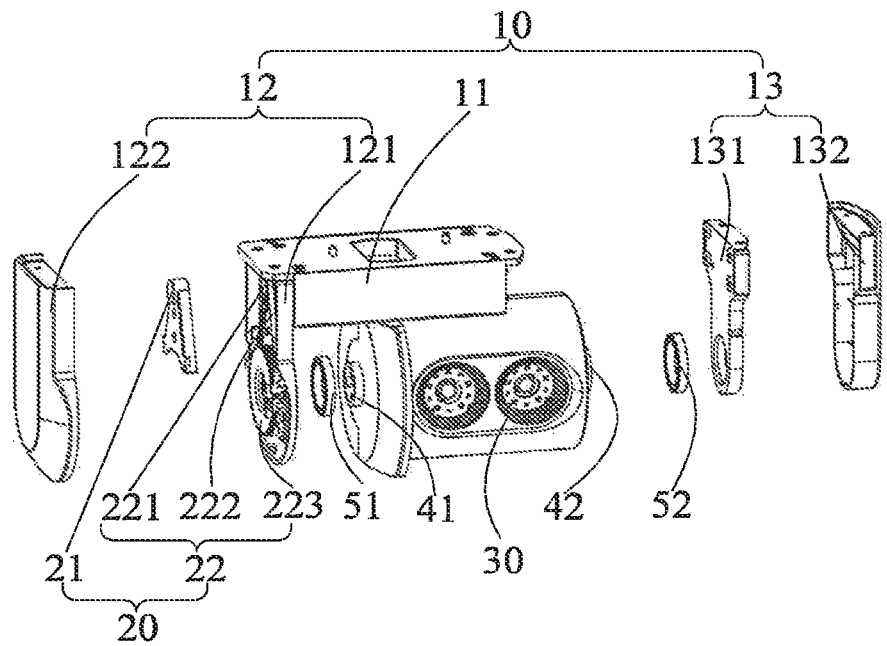
FIG. 2 is an exploded view of the wheel image acquisition assembly shown in FIG. 1.
Figure 3:
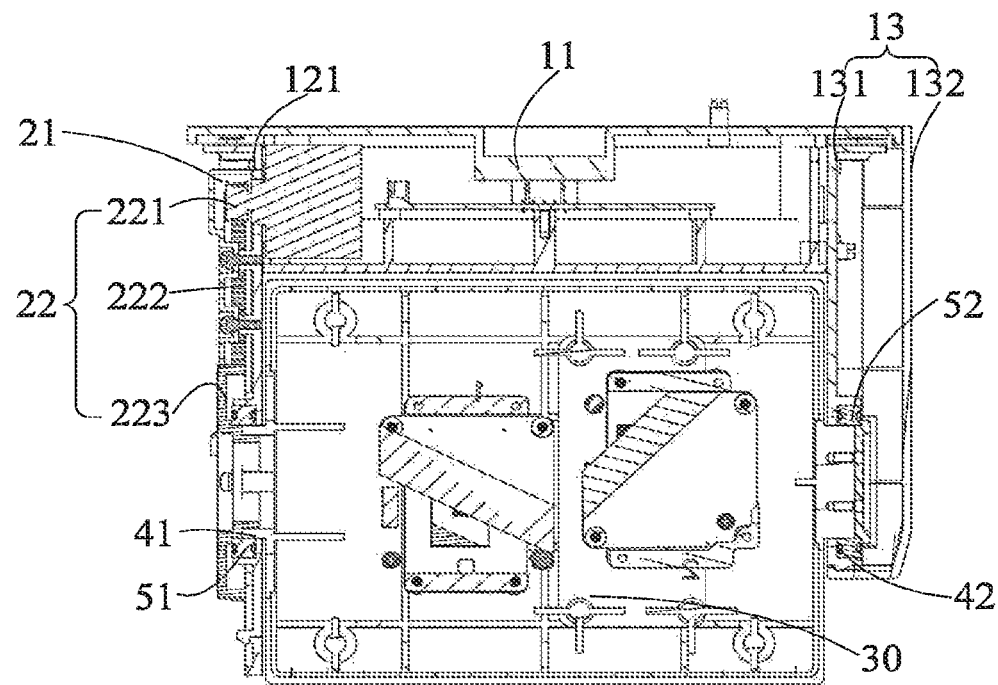
FIG. 3 is a schematic cross-sectional view of the wheel image acquisition assembly shown in FIG. 1.

With reference to FIGS. 1, 2, and 3 together, a wheel image acquisition assembly is provided by an embodiment of the present invention, comprising a base 10, a motor assembly 20, and a camera module 30. One end of the base 10 is used for connecting to a support body in a wheel positioning apparatus, and the other end of the base 10 is used for connecting to the camera module 30; the motor assembly 20 is mounted in the base 10, and the motor assembly 20 comprises a motor 21 for driving the camera module 30 to rotate about a horizontal axis so as to adjust a pitch angle of the camera module 30; the camera module 30 is used for acquiring an image of a wheel so as to determine the position of the wheel relative to a vehicle.

In an embodiment of the present application, the horizontal axis is an axis parallel to the ground on which the vehicle is located. For example, when the wheel image acquisition assembly is placed in front of or behind the vehicle, the horizontal axis is an axis parallel to the head or tail of the vehicle; when the wheel image acquisition assembly is placed on the side of the vehicle, the horizontal axis is an axis parallel to the direction of the vehicle body.

In some embodiments, the motor assembly 20 includes a processor and a controller. The processor is connected to the camera module 30 and is configured to determine a rotation angle according to an image of a wheel acquired by the camera module 30. The controller is configured to control the rotation of the motor 21 according to the rotation angle to drive the camera module 30 to rotate about a horizontal axis.

In some other embodiments, the processor in the motor assembly 20 may be eliminated. For example, the camera module 30 uploads the acquired wheel image to a processing device in the wheel positioning apparatus, the processing device in the wheel positioning apparatus processing the wheel image acquired by the camera module to determine the rotation angle. The controller controls the motor 21 to rotate according to the rotation angle to drive the camera module 30 to rotate about the horizontal axis, In an embodiment of the present application, the rotation angle refers to a required rotation angle of the camera module determined according to an image acquired by the camera module, so that the visual field range of the camera module can completely cover the wheel on one side of the vehicle.

The base 10 comprises a base body 11, and two support frames provided on two opposite sides of the base body 11. The two support, frames are a first support frame 12 and a second support frame 13 respectively; the base body 11 is connected to a support body in the wheel positioning apparatus; the camera module 30 is rotatably mounted between the first support frame 12 and the second support frame 13; the motor assembly 20 is mounted to one of the two support frames. The application takes the motor assembly 20 mounted in the first support frame 12 as an example to carry out the explanation.

The motor assembly 20 further comprises a transmission mechanism 22 through which the motor 21 is connected to the camera module 30. Specifically, the transmission mechanism 22 comprises a first synchronous wheel 221, a synchronous belt 222, and a second synchronous wheel 223. The first synchronous wheel 221 is connected to the motor 21, the first synchronous wheel 221 is connected to the second synchronous wheel 223 via the synchronous belt 222, the second synchronous wheel 223 is coaxially fixed to the camera module 30, the axis of the second synchronous wheel 223 is parallel to the horizontal axis, and the motor 21 is used for driving the first synchronous wheel 221 to rotate so that the first synchronous wheel 221 drives the second synchronous wheel 223 and the camera module 30 to rotate together via the synchronous belt 222.

In the present embodiment, the wheel image acquisition assembly further comprises a rotation shaft. The number of rotation shafts is two, respectively a first rotation shaft 41 and a second rotation shaft 42. One end of the first rotation shaft 41 is coaxially fixed with the camera module 30, and the other end of the first rotation shaft 41 is fixed to the first synchronous wheel; one end of the second rotation shaft 42 is coaxially fixed with the camera module 30, and the other end of the second rotation shaft 42 is rotatably connected to the second support frame 13.

It can be understood that the first support frame 12 and the second support frame 13 are respectively provided with a first mounting hole and a second mounting hole through which the first rotation shaft and the second rotation shaft pass.

In the present embodiment, the first support frame 12 includes a first side plate 121 and a first cover plate 122. The first side plate 121 is provided on one side of the base body 11; the base body 11, the first side plate 121, and the first cover plate 122 form an accommodation space; the motor assembly 20 is accommodated in the accommodation space. The second support frame 13 comprises a second side plate 131 and a second cover plate 132. The second side plate 131 is arranged on the other side of the base body 11, and the second cover plate 132 covers the second side plate 131.

The first mounting hole is provided on the first side plate 121, and one end of the first rotation shaft 41 passes through the first mounting hole and is coaxially fixed with the second synchronous wheel 223; the second mounting hole is provided on the second side plate 131, one end of the second rotation shaft 42 passes through the second mounting hole, and the second rotation shaft 42 can rotate relative to the second mounting hole.

In order to facilitate the rotation of the camera module 30, the wheel image acquisition assembly further comprises a bearing. The number of the bearings is two, a first bearing 51 and a second bearing 52 respectively. The first bearing 51 is sleeved on the first rotation shaft 41, and the first bearing 51 is connected between the first side plate 121 and the first cover plate 122; the second bearing 52 is sleeved on the second rotation shaft 42, and the second hearing 52 is connected between the second side plate 131 and the second cover plate 132.

In some other embodiments, the transmission mechanism may be other transmission mechanisms. For example, the transmission mechanism comprises a first driving wheel and a second driving wheel, wherein the first driving wheel is connected to the motor, the first driving wheel meshes with the second driving wheel, the second driving wheel is coaxially fixed to the camera module, the axis of the second driving wheel is parallel to the horizontal axis, and the motor is used for driving the first driving wheel to rotate so that the first driving wheel drives the second driving wheel and the camera module to rotate together.

It can be understood that when the transmission mechanism is the cooperation of the first driving wheel and the second driving wheel, one end of the first rotation shaft is coaxially fixed to the camera module, and the other end of the first rotation shaft is fixed to the second driving wheel.

In an embodiment of the present application, the camera module 30 comprises two cameras, wherein the two cameras are mounted in parallel to the basal body 10, and the lens orientations of the two cameras are the same, namely, the visual field ranges of the two cameras are the same, and the two cameras respectively collect images of two wheels on the same side of the vehicle.

In some other embodiments, the camera module 30 includes only one camera, with one camera collecting images of two wheels on the same side of the vehicle.

An embodiment of the present invention provides a wheel image acquisition assembly, which can drive a camera module to rotate by its own motor, so as to adjust the pitch angle of the camera module, thereby adjusting the visual field range of the camera module adaptively according to the wheel position, making it more flexible and facilitating wheel alignment positioning in a complex environment.

Figure 4:
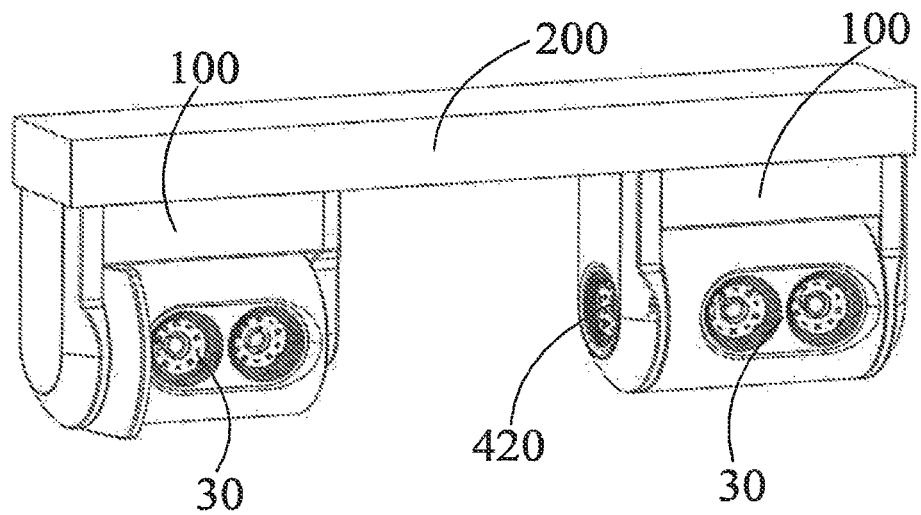
FIG. 4 is a schematic structural view of a wheel positioning apparatus according to another embodiment of the present invention.
Figure 5:
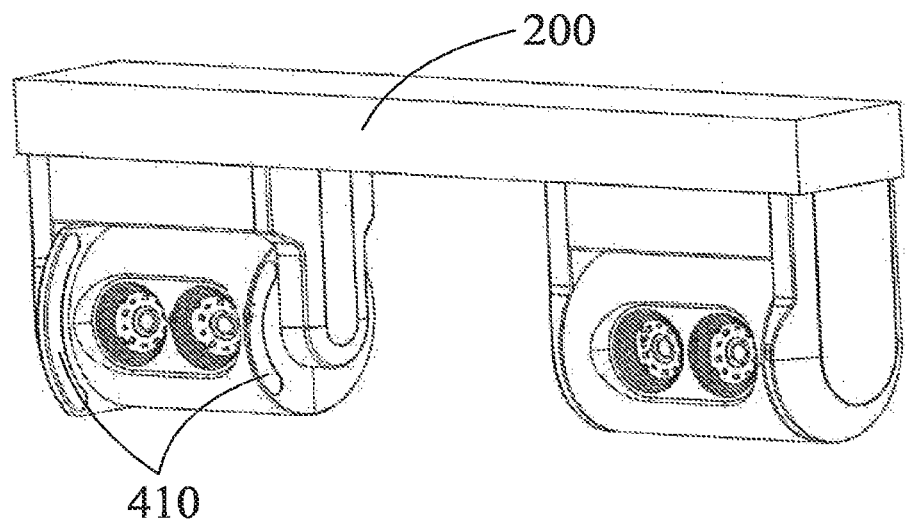
FIG. 5 is a schematic structural view of another visual angle of the wheel positioning apparatus shown in FIG. 4.
Figure 6:
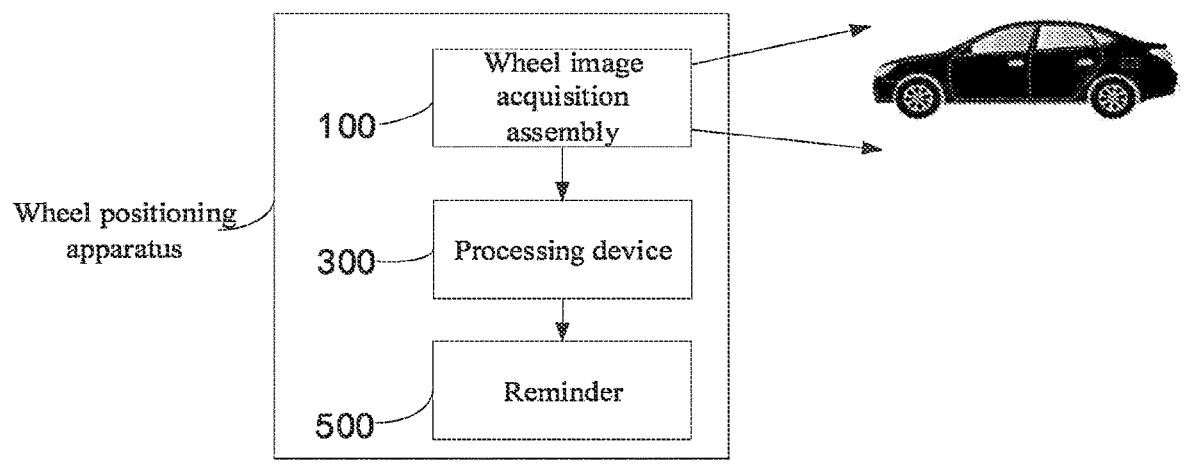
FIG. 6 is a block diagram of a system in which the wheel positioning apparatus shown in FIG. 4 measures a wheel of a vehicle.

With reference to FIGS. 4 and 5 together, a wheel positioning apparatus is provided by one of the embodiments of the present invention, comprising two above-mentioned wheel image acquisition assemblies 100, a support body 200, and a processing device 300. The two above-mentioned wheel image acquisition assemblies 100 are arranged at two ends of the support body 200 in a transversely spaced manner such that when the support body 200 is placed in a position relative to the vehicle, the visual field ranges of the camera modules 30 of the two above-mentioned wheel image acquisition assemblies 100 respectively cover the regions where the wheels on two sides of the vehicle are located: the processing device 300 is respectively electrically connected to two wheel image acquisition assemblies 100 for controlling the rotation of the camera modules 30 in the wheel image acquisition assembly 100 about a horizontal axis so as to adjust the rotation angle of the camera modules 30 in the wheel image acquisition assembly 100.

The camera module 30 of the wheel image acquisition assembly 100 is used for collecting image data of a wheel, the camera modules 30 of two wheel image acquisition assemblies 100 respectively collect image data of the wheels on two sides of the vehicle, and the processing device 300 is also used for measuring the wheel state of the vehicle according to the data collected by the camera modules 30 of the two wheel image acquisition assemblies 100.

The processing device 300 is used to control the camera module 30 of the wheel image acquisition assembly 100 to rotate about a horizontal axis to adjust the rotation angle of the camera module 30 in the wheel image acquisition assembly 100. For example, after the two wheel image acquisition assemblies 100 respectively determine the rotation angles of the respective camera modules via their own processors, and the processing devices respectively control the respective controllers to drive the camera modules to rotate according to the respective rotation angles. At this time, the rotations of the two camera modules are not synchronized. Or the processing device determines one final rotation angle according to the rotations of the two camera modules. The final rotation angle can enable the visual field ranges of the camera modules of the two wheel image acquisition assemblies to respectively cover the regions where the wheels on two sides of the vehicle are located, and the processing device simultaneously controls the two controllers to drive the camera modules in the two wheel image acquisition assemblies to rotate synchronously according to the final rotation angle. Or the camera modules of the two wheel image acquisition assemblies upload the collected image data to the processing device, the processing device determines the final rotation angle of the camera modules according to the image data, and then the processing device simultaneously controls the two controllers to drive the camera modules in the two wheel image acquisition assemblies to rotate synchronously according to the final rotation angle. In an embodiment of the present application, the processing device 300 is used to control the camera modules 30 in the two wheel image acquisition assemblies 100 to rotate synchronously about a horizontal axis, thereby adjusting the rotation angles of the camera modules 30 in the two wheel image acquisition assemblies 100.

The processing device 300 is electrically connected, such as wired or wireless, to the two wheel image acquisition assemblies. Measuring the wheel state of the vehicle is specifically positioning the wheel, including comprehensively measuring various positioning parameters of the wheel, such as a camber angle, a toe-in angle, etc.; or detecting whether the wheel needs to be positioned. A simple algorithm can be used to only judge whether the current state of the wheel needs to be comprehensively detected, namely, the wheel positioning is further performed, Here, the embodiment of the present application does not limit the algorithm or manner of detecting whether the wheel needs to be positioned.

In some embodiments, to facilitate the movement of the support body 200 to a position relative to the vehicle, the support body 200 may be mounted to one movable apparatus. For example, the support body is mounted to one stand. A roller is provided at the bottom of the stand. The support body may be moved to a position relative to the vehicle by manual control, or the support body may be controlled to move to a position relative to the vehicle by software instructions.

In an embodiment of the present application, the support body being placed at a position relative to the vehicle means that the support body is placed at a specified or preset position relative to the vehicle, or the support body is placed at any position within a specified range relative to the vehicle. In order to enable the wheel image acquisition assembly to be positioned accurately so as not to affect the accuracy of the image collected by the camera module, generally, the support body carrying the wheel image acquisition assembly is stipulated to have a position relative to the vehicle. The stipulation can be recorded on a user's operation manual, and the user can perform accurate positioning on the support body step by step through the recorded steps, or the stipulation can be executed by a processing device in the form of an executable program such that the processing device can output a control instruction to drive the support body to be automatically positioned to a specified or preset position. Alternatively, where the wheel detection algorithm allows for a certain error, the support body may be placed within a specified range relative to the vehicle. As long as the support body is within the specified range, a positioning error may be calibrated by a subsequent wheel state detection algorithm.

The wheel positioning apparatus further comprises a calibration unit, the calibration unit comprises a calibration camera 410 and a calibration target 420, the calibration camera 410 is arranged on one of the two wheel image acquisition assemblies, the calibration target 420 is arranged on the other of the two wheel image acquisition assemblies, the visual field range of the calibration camera 410 covers the calibration target 420, the calibration camera 410 is used for collecting image data of the calibration target 420, the calibration camera 410 is electrically connected to the processing device 300, and the processing device 300 is further used to determine the relative position of the two wheel image acquisition assemblies 100 according to the image data collected by the calibration camera 410.

In an embodiment of the present application, the relative position of the calibration camera and the wheel image acquisition assembly mounted to the calibration camera is known or can be known, and the relative position of the calibration target and the wheel image acquisition assembly mounted to the calibration target is known or can be known.

In an embodiment of the present application, the number of the calibration targets 420 is two, two calibration targets 420 are arranged in parallel, and the two calibration targets 420 face the same direction. To facilitate the easier collection of an image of the calibration target 420 by the calibration camera 410, the calibration target 420 protrudes outward from the basal body 10 to avoid obscuring the calibration target by certain features on the wheel image acquisition assembly to which the calibration target is mounted.

In some embodiments, the wheel positioning apparatus may also include a reminder 500. The reminder 500 is electrically connected to the processing device 300 for prompting a user of an output result of the processing device 300. The reminder may include at least one of a display screen, a sounder, etc.

The processing device 300 can be provided on the support body 200. The support body 200 can also be provided with a mounting groove for accommodating the processing device 300 and a transmission line through which it is electrically connected to the wheel image acquisition assembly 100, Alternatively, the processing device 300, the reminder 500, and the transmission line may all be provided in an external component attached to the outer surface of the support body. It can be understood that the processing device 300 may be wirelessly connected to the wheel image acquisition assembly 100 when an external component is attached to the support body. It can be understood that the support body 200 may also be provided with a power supply device for supplying power to the wheel image acquisition assembly, the processing device, the reminder, etc. The power supply device includes a battery, wherein the battery may be a zinc-manganese battery, an alkaline battery, a nickel-cadmium battery, and a lithium battery, or a rechargeable storage battery, etc. Optionally, the power supply device may be detachably mounted to the support body, or the power supply device may be fixedly mounted to the support body.

An embodiment of the present invention provides a wheel positioning apparatus. Because a camera module can be driven to rotate by a wheel image acquisition assembly via a motor thereof so as to individually adjust the visual field range of the camera module, the wheel positioning apparatus can control the camera modules of two wheel image acquisition assemblies to rotate via a processing device so as to adjust the visual field ranges of the camera modules of the two wheel image acquisition assemblies. The operation is simple and is highly flexible, and can better measure the wheel state of the vehicle.

Figure 7:
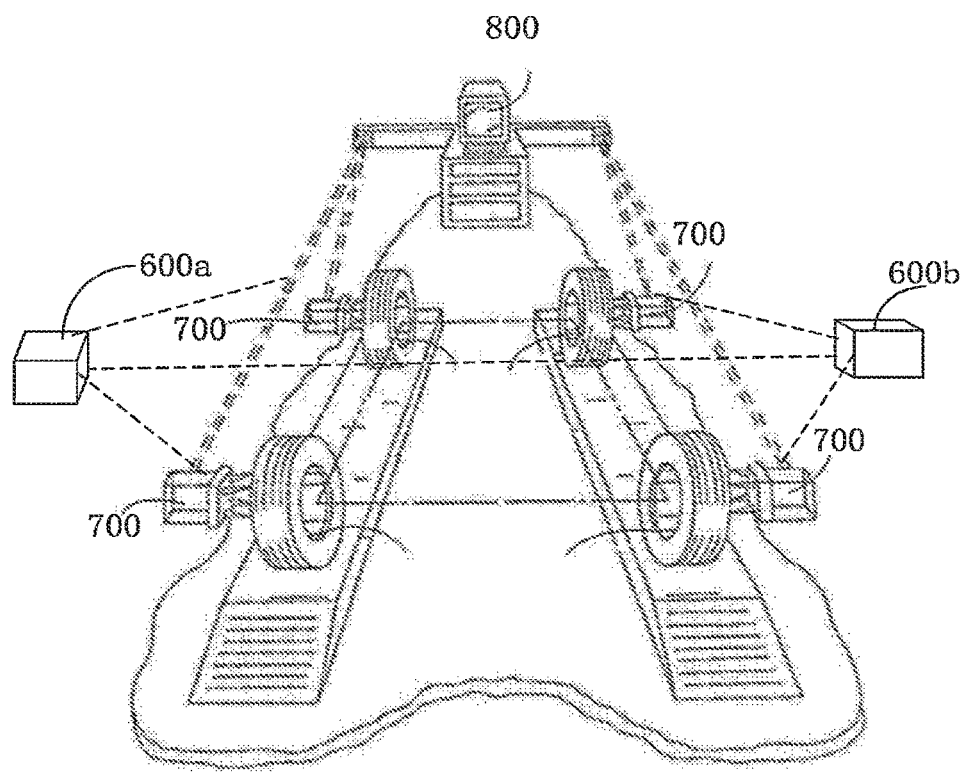
FIG. 7 is a schematic structural view of a wheel positioning system according to another embodiment of the present invention.

Referring to FIG. 7, the wheel image acquisition assembly 100 is applicable to a wheel positioning system. The wheel positioning system comprises two camera devices 600a and 600b, a calibration device 700, and a processing system 800. The first camera device 600a of the two camera devices 600a and 600b comprises the above-mentioned wheel image acquisition assembly 100, and the second camera device 600b of the two camera devices 600a and 600h comprises the above-mentioned wheel image acquisition assembly 100 and a calibration camera 420; the calibration device 700 is attached to wheels on two sides of a vehicle, the first camera device 600a is provided on one side of the vehicle, the visual field range of the wheel image acquisition assembly of the first camera device 600a faces the calibration device 700 on one side of the vehicle, the wheel image acquisition assembly of the first camera device 600a is used for collecting a first calibration image of the calibration device 700 on one side of the vehicle, and the second camera device 600b is provided on the other side of the vehicle; the wheel image acquisition assembly in the second camera device 600b has a visual field range facing the calibration device 700 on the other side of the vehicle, the calibration camera 420 in the second camera device 600h has a visual field range facing the first camera device 600a, the second camera device 600h is used for collecting a second calibration image of the calibration device 700 on the other side of the vehicle, and the calibration camera 420 is used for collecting a third calibration image of the first camera device. The processing system 800 is respectively connected to the two camera devices 600a and 600b. The processing system 800 is used for determining the first position of a wheel on one side of the vehicle with respect to the first camera device 600a according to the first calibration image, determining the second position of a wheel on the other side of the vehicle with respect to the second camera device 600b according to the second calibration image, determining a relative position of the first camera device 600a with respect to the second camera device 600b according to the third calibration image, and determining a position parameter of a wheel of the vehicle according to the first position, the second position, and the relative position.

In an embodiment of the present application, the relative position of the calibration camera and the second camera device is known or can be known so that the processing system can determine the relative position of the first camera device 600a to the second camera device 600b according to the third calibration image.

It can be understood that a calibration target can also be provided on the first camera device 600a, and the relative position of the first camera device and the second camera device is determined by collecting an image of the calibration target by the calibration camera. At this time, the relative position of the calibration target and the first camera device is also known or can be known.

It should be understood that the above-described calibration device 700, which is a target plate, is correspondingly provided with a target element for positioning. The target element can be a geometric shape such as a circle, a triangle, or a trapezoid. The position of the wheel can be known through the target element by the wheel image acquisition assembly 100 and the camera device 600.

An embodiment of the present application provides a wheel positioning system, in which the camera module is driven to rotate by its own motor so as to individually adjust the visual field range of the camera module. Therefore, it makes the operation of the visual field ranges of the two groups of cameras covering the regions where the wheels on two sides are located simple.

Finally, it should be noted that the above embodiments are merely illustrative of the technical schemes of the present invention, rather than limiting it; combinations of technical features in the above embodiments or in different embodiments are also possible under the concept of the invention, the steps can be implemented in any order, and there are many other variations of different aspects of the invention described above, which are not provided in detail for the sake of brevity; although the present invention has been described in detail with reference to the foregoing embodiments, those skilled in the art should appreciate that the technical schemes disclosed in the above-mentioned embodiments can still be amended, or some of the technical features can be replaced by equivalents; such modifications or substitutions do not make the essence of the corresponding technical scheme depart from the scope of the technical schemes of the embodiments of the invention.

The invention claimed is:

1. A wheel image acquisition assembly applied in wheel positioning of a vehicle, comprising a base, a motor assembly, and a camera module:
wherein one end of the base is used for connecting to a support body in a wheel positioning apparatus, and the other end of the base is used for connecting to the camera module;
the motor assembly is mounted in the base and comprises a motor, the motor being used for driving the camera module to rotate about a horizontal axis to adjust a pitch angle of the camera module;
the camera module is used for collecting an image of a wheel such that a position of the wheel relative to the vehicle is determined;
wherein
the motor assembly further comprises a controller and a processor;
the processor is connected to the camera module, and the processor is used for determining a rotation angle according to an image of the wheel collected by the camera module;
the controller is connected to the processor, and the controller is used for controlling a motor according to the rotation angle so as to rotate the camera module:
wherein
the motor assembly further comprises a transmission mechanism, and the motor is connected to the camera module via the transmission mechanism;
wherein
the transmission mechanism comprises a first synchronous wheel, a synchronous belt, and a second synchronous wheel;
the first synchronous wheel is connected to the motor, the first synchronous wheel is connected to the second synchronous wheel via the synchronous belt, and the second synchronous wheel is coaxially fixed to the camera module;
an axis of the second synchronous wheel is parallel to the horizontal axis;
the motor is used for driving the first synchronous wheel to rotate so that the first synchronous wheel drives the second synchronous wheel and the camera module to rotate together via the synchronous belt.

2. The wheel image acquisition assembly according to claim 1, wherein
the motor assembly further comprises a controller;
the wheel image acquisition assembly is used for uploading the image of the wheel collected by the camera module to a processing device in the wheel positioning apparatus so as to determine a rotation angle;
the controller is used for controlling the motor according to the rotation angle so as to rotate the camera module.

3. The wheel image acquisition assembly according to claim 1, wherein
the transmission mechanism comprises a first driving wheel and a second driving wheel;
the first driving wheel is connected to the motor, the first driving wheel meshes with the second driving wheel, and the second driving wheel is coaxially fixed to the camera module;
an axis of the second driving wheel is parallel to the horizontal axis;
the motor is used for driving the first driving wheel to rotate so that the first driving wheel drives the second driving wheel and the camera module to rotate together.

4. The wheel image acquisition assembly according to claim 1, wherein
the base comprises a base body and two support frames provided on two opposite sides of the base body;
the base body is connected to a bracket in the wheel positioning system, and the camera module is rotatably mounted between the two support frames;
the motor assembly is mounted to one of the two support frames.

5. The wheel image acquisition assembly according to claim 4, wherein
the wheel image acquisition assembly further comprises a first rotation shaft and a second rotation shaft;
one end of the first rotation shaft is fixed to the camera module, and the other end is fixed to the second synchronous wheel;
one end of the second rotation shaft is fixed to the camera module, and the other end is rotatably connected to one support frame of the two support frames which is not mounted with a motor assembly.

6. The wheel image acquisition assembly according to claim 1, wherein
the camera module comprises two cameras, and the two cameras respectively collect images of two wheels on a same side of the vehicle; or
the camera module comprises one camera, and the one camera collects images of two wheels on the same side of the vehicle.

7. A wheel positioning apparatus, comprising:
a support body;
two wheel image acquisition assemblies according to claim 1, wherein the two wheel image acquisition assemblies are arranged at two ends of the support body in a transversely spaced manner, and when the support body is placed at a position relative to the vehicle, visual field ranges of the camera modules of the two wheel image acquisition assemblies respectively cover regions where the wheels on two sides of the vehicle are located;
and a processing device electrically connected to the two wheel image acquisition assemblies for controlling a rotation of the camera modules in the wheel image acquisition assembly about the horizontal axis so as to adjust the rotation angle of the camera module in the wheel image acquisition assembly.

8. The wheel positioning apparatus according to claim 7, wherein the processing device is used to control the camera modules in the two wheel image acquisition assemblies to rotate synchronously about the horizontal axis to adjust the rotation angle of the camera modules in the two wheel image acquisition assemblies.

9. The wheel positioning apparatus according to claim 7, wherein
the camera module of the wheel image acquisition assembly is used for collecting image data of a wheel, and the processing device is further used for measuring a wheel state of the vehicle according to data collected by the camera modules of the two wheel image acquisition assemblies.

10. The wheel positioning apparatus according to claim 7, wherein the wheel positioning apparatus further comprises a calibration unit which comprises a calibration camera and a calibration target, the calibration camera is arranged on one of the two wheel image acquisition assemblies, and the calibration target is arranged on the other of the two wheel image acquisition assemblies; and
a visual field range of the calibration camera covers the calibration target and the calibration camera is electrically connected to the processing device, and the processing device is further used for determining a relative position of the two wheel image acquisition assemblies according to image data collected by the calibration camera.

11. The wheel positioning apparatus according to claim 7, wherein the processing device is provided on the support body.

12. The wheel positioning apparatus according to claim 7, wherein the wheel positioning apparatus further comprises a reminder;
wherein the reminder is electrically connected to the processing device for prompting a user of an output result of the processing device.

13. A wheel positioning system applied to four-wheel positioning of a vehicle, comprising a calibration device, two camera devices, and a processing system;
wherein a first camera device of the two camera devices comprises the wheel image acquisition assembly according to claim 1;
a second camera device of the two camera devices comprises the wheel image acquisition assembly according to claim 1 and a calibration camera;
the calibration device is attached to wheels on two sides of the vehicle, the first camera device is provided on one side of the vehicle, a visual field range of the wheel image acquisition assembly of the first camera device faces the calibration device on one side of the vehicle for collecting a first calibration image of the calibration device on one side of the vehicle, the second camera device is provided on the other side of the vehicle, the visual field range of the wheel image acquisition assembly in the second camera device faces the calibration device on the other side of the vehicle for collecting a second calibration image of the calibration device on the other side of the vehicle, the visual field range of the calibration camera in the second camera device faces the first camera device, and the calibration camera is used for collecting a third calibration image of the first camera device;
the processing system is respectively connected to the two camera devices, and the processing system is used for determining a first position of a wheel on one side of the vehicle with respect to the first camera device according to the first calibration image, determining a second position of a wheel on the other side of the vehicle with respect to the second camera device according to the second calibration image, determining a relative position of the first camera device with respect to the second camera device according to the third calibration image, and determining a positional parameter of the wheel of the vehicle according to the first position, the second position, and the relative position.

* * * * *